(12) United States Patent
Bruck et al.

(10) Patent No.: US 10,293,434 B2
(45) Date of Patent: May 21, 2019

(54) METHOD TO FORM DISPERSION STRENGTHENED ALLOYS

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 705 days.

(21) Appl. No.: 14/469,650

(22) Filed: Aug. 27, 2014

(65) Prior Publication Data

US 2016/0214209 A1 Jul. 28, 2016

Related U.S. Application Data

(63) Continuation-in-part of application No. 13/956,521, filed on Aug. 1, 2013, now abandoned.

(51) Int. Cl.
| | |
|---|---|
| *B23K 26/211* | (2014.01) |
| *C22C 1/02* | (2006.01) |
| *C22C 33/02* | (2006.01) |
| *C22C 1/10* | (2006.01) |
| *B22F 7/06* | (2006.01) |
| *B22F 7/08* | (2006.01) |
| *C22C 32/00* | (2006.01) |
| *B23K 103/16* | (2006.01) |

(52) U.S. Cl.
CPC ............ *B23K 26/211* (2015.10); *B22F 7/064* (2013.01); *B22F 7/08* (2013.01); *C22C 1/02* (2013.01); *C22C 1/1036* (2013.01); *C22C 32/0047* (2013.01); *C22C 33/02* (2013.01); *B22F 2999/00* (2013.01); *B23K 2103/16* (2018.08)

(58) Field of Classification Search
CPC .............. B23K 26/211; B23K 2203/16; B23K 2103/16; B22F 7/064; B22F 7/08; B22F 2999/00; C22C 1/02; C22C 1/1036; C22C 32/0047; C22C 33/02
USPC ..................................... 219/121.64
See application file for complete search history.

(56) References Cited

U.S. PATENT DOCUMENTS

| | | | |
|---|---|---|---|
| 4,299,860 A | 11/1981 | Schaefer et al. | |
| 4,481,032 A * | 11/1984 | Kaiser | ...................... C21C 1/02 75/526 |

(Continued)

FOREIGN PATENT DOCUMENTS

| | | |
|---|---|---|
| DE | 102015113762 A1 | 3/2016 |
| JP | 58100602 A | 6/1983 |

OTHER PUBLICATIONS

Jiang, W.H., et al., "Laser deposited TiC/H13 tool steel composite coatings and their erosion resistance," Journal of Materials Technology, 2007, vol. 186, pp. 331-338.

(Continued)

*Primary Examiner* — Chee-Chong Lee (57) ABSTRACT

A method for forming a dispersion strengthened alloy. An alloy material (8) is melted with a heat source (28) to form a melt pool (30) in the presence of a flux material (26), and strengthening particles (36) are directed into the melt pool such that the particles are dispersed within the melt pool. Upon solidification, a dispersion strengthened alloy (44) is formed as a layer or weld joint bonded to an underlying substrate or as an object contained in a removal support.

20 Claims, 2 Drawing Sheets

(56) References Cited

U.S. PATENT DOCUMENTS

| | | | |
|---|---|---|---|
| 4,488,882 A | 12/1984 | Dausinger et al. | |
| 4,644,127 A | 2/1987 | LaRocca | |
| 4,705,261 A * | 11/1987 | Wirth, Jr. | C21C 7/0056 |
| | | | 266/216 |
| 4,732,778 A | 3/1988 | Kawasaki | |
| 4,832,982 A | 5/1989 | Mori et al. | |
| 4,981,716 A | 1/1991 | Sundstrom | |
| 5,104,293 A | 4/1992 | Eaton, Jr. et al. | |
| 6,750,430 B2 * | 6/2004 | Kelly | B21C 37/042 |
| | | | 219/146.31 |
| 7,836,593 B2 | 11/2010 | Allen | |
| 2004/0045641 A1 * | 3/2004 | Kawasaki | C22C 1/0425 |
| | | | 148/435 |
| 2005/0150871 A1 * | 7/2005 | Offer | B23K 20/10 |
| | | | 219/76.17 |
| 2011/0061591 A1 * | 3/2011 | Stecker | B22F 3/1055 |
| | | | 118/663 |
| 2012/0181255 A1 * | 7/2012 | Bruck | B23K 9/324 |
| | | | 219/73.2 |
| 2013/0136868 A1 | 5/2013 | Bruck et al. | |
| 2013/0299470 A1 | 11/2013 | Park et al. | |
| 2014/0220374 A1 | 8/2014 | Bruck et al. | |

OTHER PUBLICATIONS

Li Fu-quan, et al., "Microstructures of surface modification layer on Q235 steel produced by laser melt injection of WC," Trans. Nonferrous Met. Soc. China, 2009, vol. 19, s558-s562.

Popoola, A.P.I., "Hardness, Microstructure and Corrosion Behavior of WC—9Co—4Cr+TiC Reinforced Stainless Steel," Int. J. Electrochem. Sci., 2014, vol. 9, pp. 1273-1285.

Vreeling, J.A., et al., "Laser Melt Injection in Aluminum Alloys: On the Role of the Oxide Skin," Act. mater., 200, vol. 48, 4225-33.

Mertinger, V., et al., "In Situ Synthesis of a Wear Resistant Layer on the Surface of Low Carbon Steel produced by Laser Melt Injection Technology," Materials Science, Testing and Informatics VI, p. 181 (Trans Tech Publications, Inc., Oct. 2012).

Semiletova, E.F., et al., "Laser Alloying of the Surface by Tungsten Carbide," Manuf. and Ind. Eng., 2012, vol. 11(3), ISSN 1336-6549.

* cited by examiner

METHOD TO FORM DISPERSION STRENGTHENED ALLOYS

This application is a continuation-in-part of co-pending U.S. patent application Ser. No. 13/956,521 filed on 1 Aug. 2013, the entire contents of which are incorporated herein by reference.

FIELD OF THE INVENTION

This invention relates generally to the field of metal-component fabrication and repair, and more particularly to the formation of dispersion strengthened alloys.

BACKGROUND OF THE INVENTION

Surface hardening is a process of hardening the surface of a metal object while allowing the metal underneath to remain relatively soft, and generally involves forming a thin layer of a harder metal at the surface of the metal object. This may be accomplished by dispersing strengthening particles such as metal carbides, metal nitrides, metal oxides or hard metals into a metallic matrix to form a so-called dispersion strengthened alloy which is harder than the base matrix and may exhibit improved wear resistance. In some cases these strengthening particles may be dispersed throughout a substrate or metal object to improve surface hardness and overall strength.

One example of a dispersion strengthened alloy is NS-163™, which is a cobalt-based alloy formed by heat treating the base alloy (Co-28Cr-21Fe-9Ni-1.25Ti-1Nb) under an atmosphere of nitrogen to form a dispersion of metal nitride particles throughout the resulting alloy. Although the resulting dispersion strengthened alloy exhibits excellent stress-rupture strength at temperatures up to 1204° C., it also presents certain disadvantages with respect to its formation and workability. For example, the heat treatment strengthening process is limited to relatively thin substrates, e.g. about 2.5 mm maximum. Also, after fabrication and heat treatment the alloy cannot be effectively processed by forming or welding because such heating/melting processes lead to a reduction or elimination of the original strengthening effect. It is thought that this degradation occurs when heat from the subsequent metalworking process reduces, changes or eliminates the nitride dispersion that formed during the original heat treatment process. As a result, the nitride dispersions may be disrupted in that portion of the previously strengthened alloy subject to the subsequent metal working—thus causing the effected portion of the alloy to be weaker than a remainder of the alloy.

Figure 1:
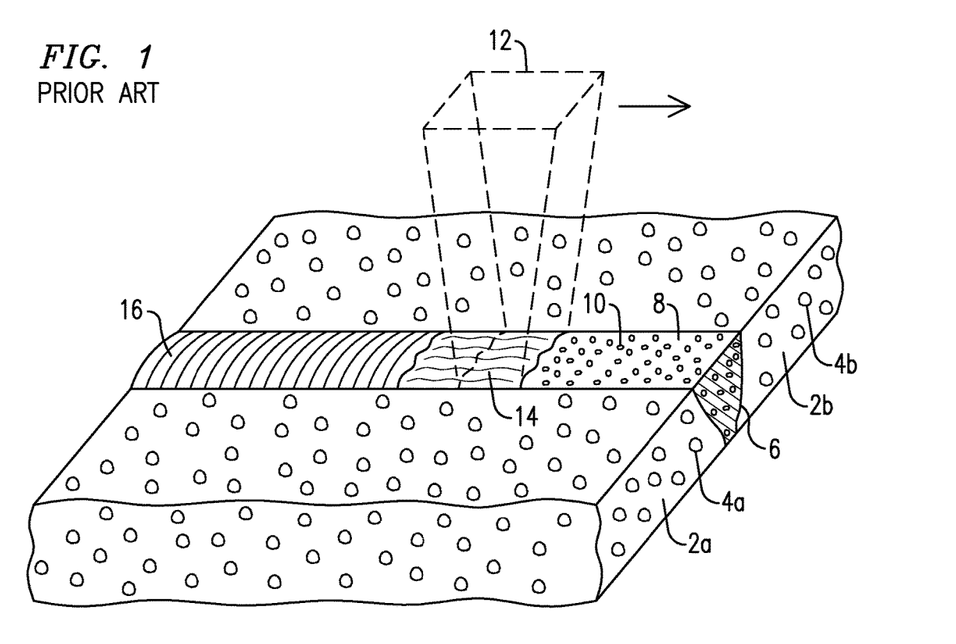
FIG. 1 is an illustration of a prior art welding process for joining two dispersion strengthened metal substrates.
Figure 2:
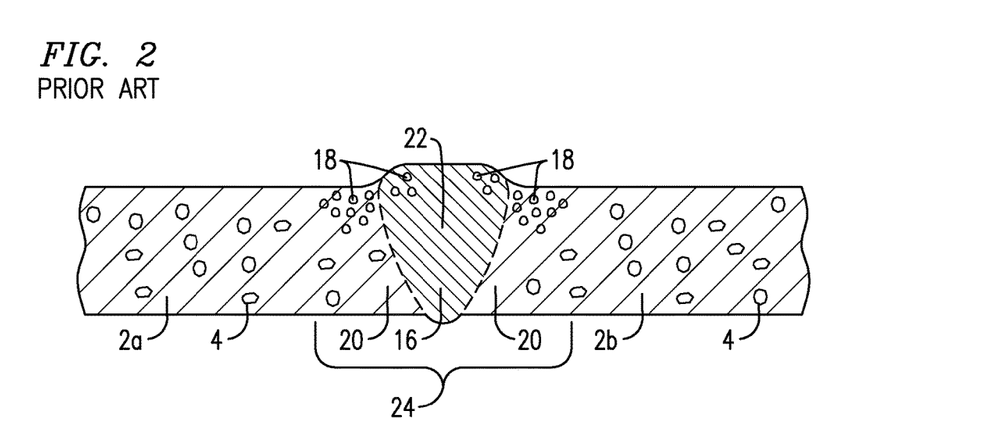
FIG. 2 is a cross-sectional view of a welded structure obtained by the process depicted in FIG. 1.

FIGS. 1 and 2 illustrate this problem. FIG. 1 depicts a prior art welding process for edge-to-edge joining of two dispersion strengthened metal substrates, such as NS-163, containing a dispersion of strengthening particles. In a typical, non-limiting example two dispersion strengthened metal substrates 2a,b are juxtaposed such that their respective edges form a joint 6 (exemplified in FIG. 1 as a single-V-groove). A filler material 8 containing an alloy material 10 may then be deposited into the groove 6, and subsequently melted by traversing an energy beam 12 across the surface of the filler material 8 to form a melt pool (i.e., weld pool) 14 within the groove 6. Upon cooling and solidification, the melt pool 14 forms a weld joint 16 that fuses the two ends of the metal substrates 2a,b together.

As explained above, the process of FIG. 1 introduces points of weakness into the resulting welded structure by causing a disruption of the particle dispersions within the previously hardened substrate material. FIG. 2 illustrates a cross-sectional view of the welded structure of FIG. 1, in which the weld joint 16 contains an area 22 having reduced and/or segregated dispersions 4. The segregation of nitrides within the melt zone is likely due in some part to differences in density between nitride particles (e.g., 5.22 g/cm$^3$ for TiN and 8.4 g/cm$^3$ for NbN versus 7.95 g/cm$^3$ for alloy NS-163). Such nitrides have higher melting temperature than the general alloy (e.g., 2930° C. for TiN and 2573° C. for NbN versus 1288 to 1400° C. for the NS-163 substrate). So, upon the solidification of the nitrides, some nitride particles may segregate at a top surface and some may sink toward a bottom surface during the balance of weld solidification. Furthermore, areas 20 within the heat affected zone of the original matrix of the dispersion strengthened substrates 2a,b are also devoid of nitride dispersions, or contain nitrides having altered shape and size. The reason for this is likely due to diffusion of nitrogen at elevated temperature causing dissolution and agglomeration of nitrides and/or changes to their shape. As a result of segregations and alterations of nitrides in the weld joint 16 and adjacent heat affected zones, a weakened portion 24 results within, and in the vicinity of, the weld joint 16.

So, in summary, welding of dispersion strengthened alloys such as NS-163 is problematic because the heat of welding (e.g., arc, laser, plasma, etc.) can lead to the mal-distribution of the strengthening particles by dissolving and segregating them and/or by altering their size and shape. These combined effects result in a weld zone 24 of inferior properties relative to the original dispersion strengthened alloy.

BRIEF DESCRIPTION OF THE DRAWINGS

The invention is explained in the following description in view of the drawings that show.

DETAILED DESCRIPTION OF THE INVENTION

The present Inventors have recognized that a need exists to discover methods for forming dispersion strengthened alloys which avoid the disadvantages described above. An optimal method would allow joining and welding of dispersion strengthened alloys without imparting areas of mechanical weakness caused by disruption of the original particle dispersions. An optimal method would also allow small-scale and large-scale formation of dispersion strengthened alloys with an enhanced ability to control the distribution and characteristics of the strengthening particles contained in the resulting alloys, as well as the grain shape and structure of the alloy matrix.

Disclosed herein are methods for forming dispersion strengthened alloys, in which strengthening particles are directed or injected into a molten pool of metallic material generated with a heat source optionally in the presence of a flux material. The size and distribution of strengthening particles contained in the resulting dispersion strengthened alloys can be varied by controlling a number of factors including the melting point, density, size and trajectory of the strengthening particles, as well as the shape, duration and intensity of heat imparted by the heat source. Use of flux materials can avoid the necessity to conduct these methods under rigorously air-free conditions, and can unexpectedly provide dispersion strengthened alloys having improved mechanical characteristics without requiring additional heat treatment. The grain structure of the resulting alloys may also be engineered through directional solidification using refractory materials having different thermal conductivities. Such methods may be applied to the fabrication and repair of dispersion strengthened alloys in a variety of contexts, and may also be applied to the bulk production of dispersion strengthened alloys whose mechanical properties can be precisely controlled.

Figure 3:
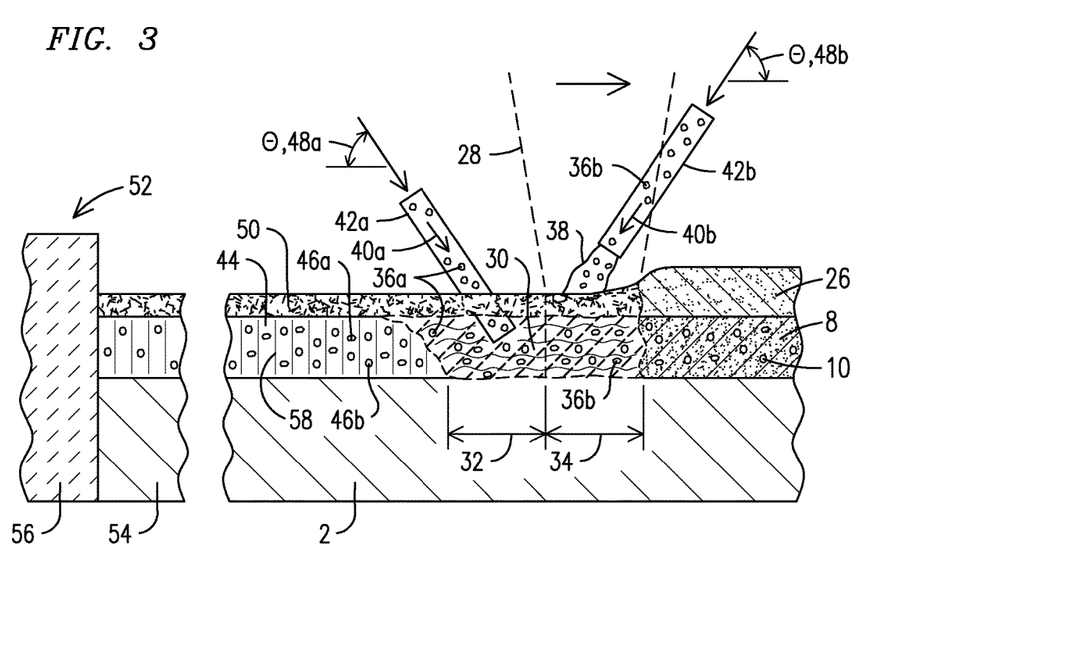
FIG. 3 illustrates laser melting processes for producing dispersion strengthened alloys from a powdered filler material in the presence of a flux material.

FIG. 3 depicts an exemplary method of the present disclosure which is applicable to various embodiments. In this illustration a filler material 8 containing alloy particles 10 is deposited onto the surface of a support material 2. The support material 2 can be a variety of materials including a dispersion strengthened alloy such as NS-163. The support provided by the support material 2 can apply to a variety of contexts—such as for example the support provided by the groove 6 formed by the arrangement of the metal substrates shown in FIG. 1. Thus, in the context of a metal joining process the support material 2 may be provided by at least two juxtaposed metal substrates whose adjacent edges affect the shape of resulting weld joint. In other contexts applicable to the present disclosure the support material 2 may be provided by the surface of a single metal substrate (as in a cladding process) or by the surface of a refractory surface or container (as in a bulk alloy production process).

A heat source 28 is then traversed (shown in FIG. 3 moving from left to right) across the surface of the filler material 8 to melt it and thereby form a melt pool 30 containing a molten matrix of the alloy. Non-limiting examples of the heat source 28 include an arc, a plasma, an electron beam, and a laser beam. In the non-limiting embodiment of FIG. 3, the heat source 28 is a laser beam. As shown in FIG. 3, the melt pool 30 encompasses a heating portion 34 located under the focal point of the laser beam 28 and a non-heating portion 32 located behind the focal point of the laser beam 28. It will be appreciated that a temperature of the melt pool 30 in the heating portion 34 is generally greater than a temperature of the melt pool 30 in the non-heating portion 32.

In the embodiment of FIG. 3, an injection nozzle 42a is used to inject strengthening particles 36a contained within a propellant gas 40a into the non-heating portion 32 of the melt pool 30 such that the strengthening particles 36a are not contacted by the laser beam 28. The strengthening particles 36a may also be directed into the heating portion 34 of the melt pool 30, or into both the heating portion 34 and the non-heating portion 32—such that strengthening particles 36b are contacted by the laser beam 28. The outlet of the injection nozzle 42a may be immersed within the melt pool 30 as shown in FIG. 3. In some embodiments the use of such direct injection improves uniformity of the molten dispersion, leading to improved mechanical and/or thermal properties in the resulting dispersion strengthened alloy 44.

Injection nozzles 42a used to directly inject particles into the melt pool 30 may be in the form of hollow nozzles made of refractory materials such as ceramics (e.g., $ZrO_2$), carbides (e.g., WC), nitrides (e.g., BN) and graphite. In other embodiments the direct injection nozzle 42a may be in the form of a consumable cored injector. One non-limiting example employs a consumable cored injector constructed of a wire made of a nickel or a nickel alloy sheath surrounding a powdered core material containing at least the strengthening particles 36a. In such embodiments the consumable cored injector is fed into the melt pool 30 causing the metallic sheath to melt because it is of a relatively low melting point. The powdered core material is then distributed into the melt pool 30 to form the dispersed strengthening particles 46a,b. In some embodiments employing a consumable cored injector, the cored injector 42a may be preheated and/or oscillated within the melt pool 30 further heating the melt pool 30 and/or distributing the particles. The consumable cored injector may be fed into the non-heated portion 32 or the heated portion 34 of the melt pool 30. In some cases the powdered cored material may contain both the strengthening particles 36a and a flux material.

Alternatively or in addition, as illustrated in FIG. 3, the outlet of an injection nozzle 42b may be positioned above the melt pool 30, such that a stream 38 of strengthening particles 36b contained in a propellant gas 40b is directed into the melt pool 30 by penetrating the surface of the heating and/or non-heating portions 32, 34. When more than one nozzle (injector) 42a,b is employed, the strengthening particles 36a and 36b may be the same or different (in terms of their contents and/or sizes), and the propellant gases 40a and 40b may also be the same or different.

In the illustration of FIG. 3, a flux material 26 may be deposited onto the surface of the filler material 8 and, upon melting by the laser beam 28, generally forms a resulting slag layer 50 which coats the surface of the dispersion strengthened alloy 44. The flux material 26 may be deposited as a separate layer as shown in FIG. 3, or it may be continuously fed onto the filler material 8 upstream of the melt pool 30, or it may be mixed within the filler material 8. The flux material 26 may also be directed into the melt pool 30 by using one or more nozzles 42a,b in which the flux material may be either directly injected (as shown with nozzle 42a) or may be directed to penetrate the surface of the melt pool 30 (as shown with nozzle 42b). Alternatively the flux material may be contained within a consumable cored injector as explained above. In such cases the flux material may be directed, injected or fed into one or both of the non-heating and heating portions 32, 34 of the melt pool 30.

Upon cooling and solidification of the melt pool 30, a dispersion strengthened alloy 44 containing dispersed strengthening particles 46a (and optionally 46b) is formed.

The content, size, shape and distribution of the strengthening particles 46a,b contained in the resulting dispersion strengthened alloy 44 can be controlled by adjusting various parameters including: (i) the content, size, concentration and trajectory of the strengthening particles 36a,b injected or directed into the melt pool 30; and (ii) the intensity, duration and shape of heating by the heat source 28. The grain structure of the dispersion strengthened alloy 44 can also be controlled by adjusting various parameters including: (iii) the metal content of the alloy; (iv) the content, amount and trajectory of the flux material; and (v) the placement and thermal characteristics of the support material 2.

The strengthening particles 36a,b are generally comprised of at least one metallic or ceramic particle having a higher melting point than the metallic base alloy of the dispersion strengthened alloy 44. Suitable strengthening particles include metal nitrides, metal carbides, metal oxides, metal cyanides, and hard metals, to name a few. Metal nitrides that may be employed as the strengthening particles 36a,b include boron nitride, aluminum nitride, silicon nitride, titanium nitride, vanadium nitride, chromium nitride, zirconium nitride, niobium nitride, hafnium nitride, tantalum nitride and other metal nitrides known in the relevant art. Metal carbides that may be employed as the strengthening particles 36a,b include boron carbide, aluminum carbide, silicon carbide, calcium carbide, titanium carbide, vanadium carbide, chromium carbide, zirconium carbide, nickel carbide, hafnium carbide, tungsten carbide and other metal carbides known in the relevant art. Suitable metal oxides include oxides of elements such as aluminum, calcium, hafnium, silicon, titanium, thorium, yttrium and zirconium, as well as other metal oxides known to form oxide dispersion strengthened alloys. Mixtures of different strengthening particles 36a,b and/or particles having different particle sizes may be used. Pre-formed dispersion strengthened alloys may also be used as the strengthening particles 36a,b.

As explained above, the strengthening particles 36a,b may be injected directly into the melt pool 30 (via a refractory nozzle and/or via a consumable cored injector as shown with nozzle 42a) avoiding contact with the atmosphere, or may be directed into the melt pool 30 from above (as shown with nozzle 42b)

The size of the resulting dispersed particles 46a,b (commonly referred to as "dispersoids") embedded in the resulting dispersion strengthened alloy 44 is related to three factors.

First, the size of the dispersoids 46a,b is directly related to the melting point of the strengthening particles 36a,b—such that the use of a strengthening particle 36a,b having a relatively higher melting point produces relatively larger dispersoids 46a,b for a certain particle size. By illustration, when a mixture of boron nitride and chromium nitride particles of equivalent size is injected into the heating portion 34 of the melt pool 30, the resulting dispersion strengthened alloy 44 generally contains a mixture of relatively larger boron nitride dispersoids and relatively smaller chromium nitride dispersoids. This variation in the size of the resulting dispersoids occurs because chromium nitride has a significantly lower melting point (1770° C.) as compared to boron nitride (2973° C.)—allowing a larger proportion of the chromium nitride particles to melt and dissolve (or decompose) into the matrix of the dispersion strengthened alloy. This effect allows modulation of dispersoid size by altering the melting point of a strengthening material contained in the strengthening particles 36a,b.

Second, the size of the resulting dispersoids 46a,b is directly related to the size of the precursor strengthening particles 36a,b. For example, when a mixture of relatively small and large boron nitride particles is injected into the heating portion 34 of the melt pool 30, the resulting dispersion strengthened alloy 44 generally contains a mixture of relatively large boron nitride dispersoids (corresponding to the larger strengthening particles) and relatively small boron nitride dispersoids (corresponding to the smaller strengthening particles). This effect allows modulation of dispersoid 46a,b size in the dispersion strengthened alloy 44 by altering the size of the precursor strengthening particles 36a,b.

Third, the size of the resulting dispersoids 46a,b is directly related to the intensity and duration of heat applied to the strengthening particles 36a,b and/or to the melt pool 30 by the heat source 28. For example, when strengthening particles 36a of a particular size and melting point are injected into the non-heating portion 32 of the melt pool 30, the size of the resulting dispersoids 46a in the dispersion strengthened alloy 44 is generally larger than dispersoids 46b resulting when the same strengthening particles 36b are directed into the heating portion 34 of the melt pool 30. This variation in size may occur because strengthening particles 36b directed into the heating portion 34 of the melt pool 30 receive more heat in the form of: (i) direct contact with the heat source 28 as the stream 38 passes through (for example) a laser beam in flight; and/or (ii) relatively higher temperatures which occur in the heating portion 34 of the melt pool 30 as compared to the non-heating portion 32.

This effect allows modulation of the dispersoid size by altering the trajectory of the corresponding strengthening particles 36a,b (e.g., directing or injecting strengthening particles into relatively hotter or cooler portions of the melt pool 30, with or without direct contact with the heat source 28). This effect also allows the size of dispersoids resulting from different strengthening particles to be altered or normalized (e.g., closely matched) by employing different trajectories depending upon the respective melting points and/or sizes of the strengthening particles. For example, a dispersion strengthened alloy 44 containing dispersoids 46a,b of boron nitride and chromium nitride having similar sizes may be obtained in spite of the different melting points of the corresponding particles by injecting or directing the CrN-containing particles 36a into the non-heating portion 32 while injecting or directing the BN-containing particles 36b into the heating portion 34. The angles 48a,b of the nozzles 42a,b are another factor that can be used to modulate the heating to the strengthening particles 36a,b in the melt pool 30. Changing the angle 48a, for instance, can cause the strengthening particles 36a to be directed into increasingly hotter regions of the melt pool 30 as shown in FIG. 3.

The size, shape and distribution of the strengthening particles 36a,b may also be altered by modulating the intensity, duration and shape of the heat source 28. As explained above, applying more heat to the strengthening particles 36a,b causes a higher proportion of melting which can reduce the size of the resulting dispersoids 46a,b and can potentially affect their shape in the resulting metallic matrix. Excessive heating may also lead to coalescence or slagging off of dispersoids 46a,b adversely affecting the distribution of strengthening particles within the resulting dispersion strengthened alloy 44. Thus, optimal size, shape and distribution of the dispersoids 46a,b may be attained in part by adjusting heat energy applied by the heat source (intensity and duration) as well as the size of the area heated (shape).

The term "heat source" is used herein in a general sense to describe a photon beam, an electron beam, an ion beam and a plasma beam. The term "energy beam" is used herein in a general sense to describe a relatively narrow, propagating stream of particles or packets of energy. Embodiments employing an energy beam as the heat source 28 may include the use of a light beam, a laser beam, a particle beam, a charge-particle beam, a molecular beam, etc.—which upon contact with a material imparts kinetic (thermal) energy to the material.

In some embodiments the heat source 28 is an energy beam in the form of a diode laser beam having a generally rectangular cross-sectional shape—although other known types of energy beams may be used, such as electron beam, plasma beam, one or more circular laser beams, a scanned laser beam (scanned one, two or three dimensionally), an integrated laser beam, a pulsed (versus continuous wave) laser beam, etc. The rectangular shape may be particularly advantageous for embodiments having a relatively large area to be melted. In some embodiments the intensity and shape of the energy beam 28 are precisely controlled by employing laser scanning (rastering) optics to form a weld pool 30 having a precisely defined size and shape to accommodate the trajectory of the incoming strengthening particles 36a,b. For example, such laser scanning enables a perimeter of the strengthening particles 36b directed into the melt pool 30 to fit within a perimeter of the melt pool 30.

In certain embodiments the factors described above are adjusted such that only the surfaces of the strengthening particles 36a,b are melted. Such surface melting (as opposed to complete melting) of the strengthening particles generally ensures that the resulting dispersoids 46a,b are adequately bonded to the matrix structure of the dispersion strengthened alloy 44—while still maintaining optimal shape and mechanical integrity of the original strengthening particles 36a,b to maximize the strength and thermal characteristics of the resulting dispersion strengthened alloy.

The distribution of the dispersoids 46a,b in the dispersion strengthened alloy 44 can also be controlled by altering both the velocity and concentration of strengthening particles 36a,b injected and/or directed into the melt pool 30, and by rastering the energy beam 28 to generate currents of molten material and effective mixing in the melt pool 30. Increasing either the velocity or the concentration of the strengthening particles 36a,b fired into the melt pool 30 generally increases the proportion of dispersoids 46a,b contained in the resulting dispersion strengthened alloy 44. Increasing velocity can also provide a more uniform distribution when the melt pool 30 is especially viscous. In some embodiments laser scanning (rastering) is also used to generate currents of molten material within the melt pool 30 (e.g., by inducing the Marangoni effect) which can further distribute the strengthening particles 36a,b throughout the melt pool 30.

As explained above, the grain structure of the dispersion strengthened alloy 44 can be altered by adjusting various parameters including the metal content of the alloy. The filler material 8 is often used in a powder form and contains alloy particles 10 which at least partly define the composition of the resulting dispersion strengthened alloy 44. The dispersion strengthened alloy 44 may contain a high-temperature metal matrix such as iron aluminide, iron chromium, iron-chromium-aluminum, nickel chromium and nickel aluminide, as well as other alloy systems based on iron, vanadium and niobium including stainless steels, to name a few. In certain applications the dispersion strengthened alloy 44 contains a superalloy metal matrix having a base alloying element of nickel, cobalt or nickel-iron, as well as other superalloy materials.

The term "superalloy" is used herein as it is commonly used in the art, i.e., a highly corrosion and oxidation resistant alloy that exhibits excellent mechanical strength and resistance to creep at high temperatures. Examples of superalloys include alloys sold under the trademarks and brand names Hastelloy, Inconel alloys (e.g., IN 738, IN 792, IN 939), Rene alloys (e.g., Rene N5, Rene 80, Rene 142), Haynes alloys (e.g., NS-163), Mar M, CM 247, CM 247 LC, C263, 718, X-750, ECY 768, X45, PWA 1483 and CMSX (e.g., CMSX-4) single crystal alloys.

In some embodiments the metallic composition of the dispersion strengthened alloy 44 is provided by both the alloy particles 10 and by additional metallic components either separately contained in the filler material 8 or separately fed or directed into the melt pool 30. For example, additional metallic components may be directly injected (e.g., via nozzle 42a) and/or streamed (e.g., via nozzle 42b) into the melt pool to supplement the metallic composition of the filler material 8. In other cases the metallic composition may be supplemented by metals contained in the strengthening particles 36a,b (e.g., via melting of low-melting-point oxides). In other examples the metallic composition may be supplemented by metals contained in at least one flux material. In still other embodiments the metallic composition may be supplemented by metal contained in a consumable cored injection (e.g., contained in a metallic sheath).

In some embodiments the composition of a dispersion strengthened alloy layer 44 may be adapted to function as a bond coating or as a thermal barrier coating. The terms "bond coating" and "thermal barrier coating" are used herein as they are commonly used in the art. For example, the filler material 8 and the strengthening particles 36a,b may be chosen such that the resulting dispersion strengthened alloy layer 44 contains an MCrAlY alloy (where M is selected from Ni, Co, Fe and mixtures thereof, and Y is selected from Y, La and Hf) suitable for use as a bond coat. Alternately, the filler material 8 and the strengthening particles 36a,b may be chosen such that the resulting dispersion strengthened alloy layer 44 includes ceramic materials such as zirconia and yttria, and is suitable for use as a thermal barrier coating.

The flux material 26 and the resultant slag layer 50 provide a number of functions that are beneficial to dispersion strengthened alloys of the present disclosure.

First, they function to shield both the melt pool 30 and the solidified (but still hot) dispersion strengthened alloy 44 from the atmosphere. The flux material 26 may be formulated to produce a shielding gas in some embodiments, thereby avoiding or minimizing the use of vacuum conditions or inert gas. The shielding gas may be a reducing gas, such as hydrogen, which reduces oxidation of the molten or cooling metal. The slag 50 floats to the surface of the weld pool 30 to further separate the molten or hot metal from the atmosphere. Due to the shielding effects of the flux material 26 and the resultant slag 50, in certain embodiments the method may be carried out under an oxygen-containing atmosphere—as opposed to the use of inert gas and/or vacuum conditions. In this regard the propellant gas 40a,b may be selected from inert gases such as nitrogen, argon and helium or from oxygen-containing gases including air and gaseous mixtures (e.g., lower grade inert gases) containing significant quantities (e.g., greater than 5% by volume) of oxygen. In some embodiments the propellant gas 40a,b is an inert gas (e.g., argon, helium, nitrogen) but the melting/solidification method may be performed under an oxygen-containing atmosphere.

Second, the slag layer 50 acts as a blanket allowing the solidified dispersion strengthened alloy 44 to cool slowly and evenly—thereby reducing residual stresses that can contribute to post-weld reheat cracking and strain age cracking. This blanketing effect also improves the mechanical properties of the resulting dispersion strengthened alloy by allowing more time to cool and, thereby, forming grains of certain sizes and shapes. Use of flux materials leading to the slag layer 50 in some embodiments can also unexpectedly increase the mechanical strength of the dispersion strengthened alloy 44 without the need to perform a subsequent heat treatment—presumably due to the insulating effect of the slag layer 50.

In some embodiments the grain structure of the resulting dispersion strengthened alloy 44 can be adjusted by controlling the content, form and amount of the flux material 26. Choosing flux materials resulting in a slag layer 50 of relatively lower thermal conductivity reduces the rate of cooling of the dispersion strengthened alloy 44, which provides additional time for grain formation leading to increased strength. Flux materials containing, for example, higher proportions of refractory substances such as zirconia can result in a lower thermal conductivity slag layer 50 improving the increased strength of the resulting dispersion strengthened alloys.

Third, the slag layer 50 helps to shape the melt pool 30 to keep it close to a desired height-to-width ratio. In some cases the desired height-to-width ratio ranges from 1:2 to 1:4. In other embodiments the desired height-to-width ratio is about 1:3.

Fourth, the flux material 26 provides a cleansing effect for removing trace impurities such as sulfur and phosphorous which contribute to weld solidification cracking. Such cleansing includes deoxidation of the alloy particles 10 in the filler material 8, as well as deoxidation of metallic components of the melt pool 30.

Fifth, the flux material 26 can provide an energy absorption and trapping function to more effectively convert an energy beam 28 into heat energy, thus facilitating a more precise control of heat input and a resultant tight control of temperatures within both the non-heating and the heating portions 32,34 of the melt pool 30.

Finally, the flux material 26 may be formulated to compensate for loss of volatized elements (e.g., Ti evaporated as $TiO_2$) during processing, or to actively contribute elements to the melt pool 30 that are not otherwise contained within the filler material 8.

Flux materials may be selected to accommodate any number of the above-described functions as well as other functions described below. Suitable flux materials include individual organic or inorganic compounds as well as mixtures of compounds. Such mixtures include commercially available flux materials sometimes tailored to the heat source 28 employed (e.g., commercial flux materials used in laser welding applications).

Examples of commercial flux materials capable of fulfilling at least one of the above-described functions include Lincolnweld P2007, Bohler Soudokay NiCrW-412, ESAB OK 10.16 or 10.90, Special Metals NT100, Oerlikon OP76, Sandvik 50SW or SAS1.

Examples of organic flux materials include high-molecular weight hydrocarbons (e.g., beeswax, paraffin), carbohydrates (e.g., cellulose), natural and synthetic oils (e.g., palm oil), organic reducing agents (e.g., charcoal, coke), carboxylic acids and dicarboxylic acids (e.g., abietic acid, isopimaric acid, neoabietic acid, dehydroabietic acid, rosins), carboxylic acid salts (e.g., rosin salts), carboxylic acid derivatives (e.g., dehydro-abietylamine), amines (e.g., triethanolamine), alcohols (e.g., high polyglycols, glycerols), natural and synthetic resins (e.g., polyol esters of fatty acids), mixtures of such compounds, and other organic compounds capable of fulfilling at least one function described above.

Examples of inorganic flux materials include reactive metals (e.g., iron ore), metal oxides (e.g., magnesium oxide, manganese oxide, aluminum oxide, silicon dioxide, calcium oxide, titanium oxide, yttrium oxide, zirconium oxide, hafnium oxide, copper oxide, cerium oxide), metal halides (e.g., lithium chloride, zinc chloride, barium chloride, magnesium chloride, tin chloride, calcium fluoride), halide salts (e.g., ammonium chloride), borates (e.g., borax), metal fluoroborates (e.g., potassium fluoroborate), metal sulfides (e.g., lead sulfide), metal carbonates (e.g., calcium carbonate, sodium carbonate, sodium bicarbonate, potassium carbonate), metal aluminates (e.g., cryolite), mineral acids (e.g., hydrochloric acid, hydrobromic acid, phosphoric acid), metal silicates (e.g., sodium silicate), mixtures of such compounds, and other inorganic compounds capable of fulfilling at least one function described above.

The form of the flux material may also be controlled by, for example, grinding the flux material into smaller particle sizes to increase the density of the resulting flux powder. In some embodiments it is advantageous to grind the flux materials into powders having average particles sizes ranging from 0.02 mm to 0.08 mm (22-88 microns).

The amount of flux material applied to the filler material 8 and/or the melt pool 30 also affects the grain structure. Increasing the amount of the flux material increases the thickness of the resulting slag layer 50. In some embodiments in which a powdered flux material 26 is deposited onto the surface of the filler material 8, a thickness of the powdered flux material 26 ranges from 1 mm to 7 mm. In other embodiments the thickness ranges from 5 mm to 13 mm. The amount of the flux material may also be modulated based upon the thickness of the resulting slag layer 50. For example, in some cases the amount of the flux material is adjusted so that a thickness of the resulting slag layer 50 ranges from 1 mm to 10 mm. In other embodiments the thickness of the slag layer 50 is adjusted to range from 2 mm to 5 mm.

Following cooling and solidification of the melt pool 30, the resulting slag layer 50 can be removed using physical and/or chemical methods known in the relevant art.

Methods of the present disclosure also benefit from an ability to control the outcome of the melting/solidification process based on the melting point and density of the strengthening particles and/or the flux material. The table below shows data for an exemplary set of possible melt pool constituents.

| Constituent | MP (° C.) | Density (g/cm$^3$) | Constituent | MP (° C.) | Density (g/cm$^3$) |
|---|---|---|---|---|---|
| NS-163 | 1288-1400 | 7.9 | | | |
| | | Metal Nitrides | | | |
| BN | 2973 | 2.1-3.5 | CrN | 1770 | 5.9 |
| TiN | 2930 | 5.2 | ZrN | 2952 | 7.1 |
| NbN | 2573 | 8.5 | VN | 2050 | 6.1 |
| AlN | 2200 | 3.3 | HfN | 3305 | 13.8 |
| SiN | 1900 | 3.2 | TaN | 3090 | 14.3 |
| | | Metal Carbides | | | |
| BC | 2763 | 2.5 | CrC | 1895 | 6.7 |
| AlC | 2200 | 2.4 | ZrC | 3532-3540 | 6.7 |
| SiC | 2730 | 3.2 | NiC | 3490 | 7.8 |
| CaC | 2160 | 2.2 | HfC | 3900 | 12.2 |
| TiC | 3140 | 4.9 | WC | 2785-2830 | 15.6 |
| VC | 2810 | 5.8 | | | |
| | | Flux Materials | | | |
| $Al_2O_3$ | 2072 | 3.9-4.1 | $CaF_2$ | 1418 | 3.2 |
| $SiO_2$ | 1600-1725 | 2.6 | $CaCO_3$ | 1339 | 2.7 |

Particle size and shape can be controlled to a certain extent by adjusting the melting point of the strengthening particles relative to that of the base metal alloy. By illustration, as shown in the above table the melting point for the base alloy of NS-163 ranges from 1288° C. to 1400° C. Most common metal nitrides and metal carbides have melting points exceeding the melting points of the NS-163 base alloy, which accounts in part for the strengthening ability of dispersions containing these materials. However, as the temperature of the melt pool increases to approach or exceed the melting points of certain lower-melting agents (e.g., CrN, SiN, CrC, CaC, AlC) a higher proportion of the strengthening particles melt and dissolve into the alloy matrix. Such enhanced partial melting decreases the size of the resulting dispersoids 46a,b and can also alter their shape. Consequently, particle size and shape can be altered by choosing strengthening particles with relatively lower melting points or by increasing heating of the melt pool and/or by directly contacting the strengthening particles with the heat source.

Particle dispersion may also be controlled to a certain extent by adjusting the density of the strengthening particles relative to that of the base metal alloy. By illustration, as shown in the above table the density for the base alloy of NS-163 is about 7.9 g/cm$^3$. Optimal mixing of the strengthening particles within the melt pool can be promoted by selecting strengthening materials having a similar density (e.g., NbN, ZrN, NbN, NiC) to that of the base alloy. By contrast, if a higher concentration of strengthening dispersions is desired in the upper portion of the resulting dispersion strengthened alloy, then such a particle concentration gradient may be promoted by selecting strengthening materials having a lower density (e.g., BN, TiN, AlN, SiN, BC, AlC, SiC, CaC) to that of the base alloy. A higher concentration of strengthening dispersions may also be promoted in the lower portion of the resulting dispersion strengthening alloy by selecting strengthening materials having a higher density (e.g., HfN, TaN, HfC, WC) to that of the base alloy.

The protective and thermal functions of the slag layer 50 can also be controlled to a certain extent by adjusting the melting point and density of the flux material relative to that of the base metal alloy. It is often most practicable to select a flux material having a lower melting temperature than that of the strengthening particles. However, in some embodiments the melting temperature of the flux material may exceed that of the strengthening particles. A relatively lower melting temperature of the flux material (e.g., CaF$_2$, CaCO$_3$) can promote more rapid melting and formation of the protective slag layer 50—allowing some methods of the present disclosure to be performed under an oxygen-containing atmosphere. Rapid formation of the slag layer 50 can also be promoted by selecting flux materials having a lower density (e.g., SiO$_2$, CaCO$_3$) relative to that of the base alloy.

The illustrative method depicted in FIG. 3 may be adapted to perform a wide variety of processes involving the formation of dispersion strengthened alloy materials. These include the formation and repair of dispersion strengthened alloy coatings on metallic substrates, the joining of dispersion strengthened (and non-dispersion strengthened) alloy materials (as shown in FIG. 1), and the small-scale and large-scale production of dispersion strengthened alloys (not attached to a metallic substrate) which may be processed into various forms such as sheets, ingots and powders.

Repair processes may include the joining of structures containing dispersion strengthened alloys or the repair of damaged or worn dispersion strengthened alloys. Such methods may also be applied to non-dispersion strengthened alloys—such that the resulting layer or weld joint is a dispersion strengthened alloy. In such repairs the surface of the support material 2 (or work piece) may be ground down to remove defects and then cleaned using methods known in the art, prior to performing deposition of the dispersion strengthened alloy 44 according to the present disclosure.

Figure 4:
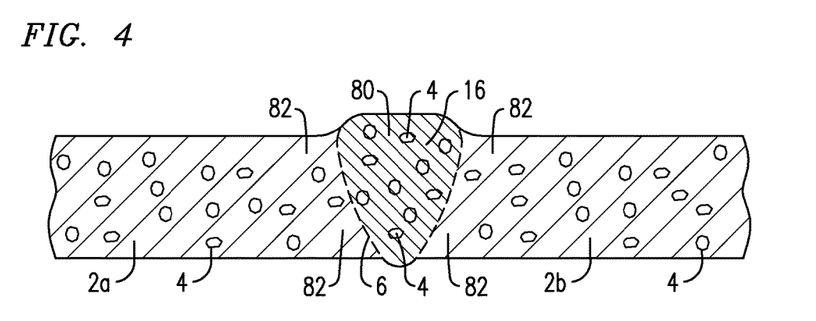
FIG. 4 is a cross-sectional view of a welded structure obtained by a process of the present disclosure.

Applying methods of the present disclosure (such as depicted in FIG. 3) to perform edge-to-edge joining of at least two dispersion strengthened metal substrates (such as shown in FIG. 1) can advantageously produce a welded object free from the defects illustrated in FIG. 2. FIG. 4 illustrates a cross-sectional view of a welded structure formed in the fashion illustrated in FIG. 1 but employing a method as depicted in FIG. 3. In this method a laser beam 28 is used to melt a filler material 8 covered by a layer of a flux material 26 to form a weld pool 30 in which metal nitride particles 36a are injected into the non-heated portion 32 of the weld pool 30. Upon cooling and solidification of the weld pool 30, a weld joint 16 having superior properties to that of FIG. 2 is formed. In contrast to the welded object of FIG. 2, the resulting weld joint 16 in FIG. 4 contains a normal dispersion 80 of the nitride particles 4, and the adjacent portions of the dispersion strengthened metal substrates 2a,b also contain normal dispersions 82. Consequently, the resulting welded structure of FIG. 4 does not contain the weakened portion 24 observed with the welded structure of FIG. 2.

The same advantage inheres to other embodiments of the present disclosure involving the formation of dispersion strengthened alloys. Thus, in methods involving the formation of cladding layers or the formation of bulk dispersion strengthened alloys, the present disclosure provides an enhanced ability to control the size and distribution of the resulting dispersoids 46a,b—leading to consistently improved mechanical properties.

In some embodiments the support material 2 is a metallic substrate, such that the resulting dispersion strengthened alloy layer 44 is deposited onto the surface of the metallic substrate to form a dispersion strengthened cladding layer. Suitable metallic substrates include all metallic materials known in the art to be compatible with dispersion strengthened alloys, including alloys in which the matrix is generally based on iron, vanadium, niobium, nickel, cobalt, chromium, platinum, or rhodium, as well as stainless steels. In some instances the support material 2 and/or the dispersion strengthened alloy layer 44 may contain a superalloy material based on nickel, cobalt or nickel-iron. The surface of the support material 2 (to which the resulting dispersion strengthened alloy layer 44 is applied) may also be in the form of a pre-existing dispersion strengthened alloy layer to form multi-layer ODS alloy materials. In such instances at least a portion of the pre-existing dispersion strengthened alloy layer is melted such that the resulting dispersion strengthened alloy layer 44 is bonded to the pre-existing dispersion strengthened alloy layer.

Bulk dispersion strengthened alloys may also be prepared using the present methods (such as that depicted in FIG. 3) by employing a fugitive support as the support material 2. The term "fugitive" means removable after formation of the dispersion strengthened alloy layer 44. Such removal may occur, for example, using direct (physical) removal, mechanical processes, fluid washing, chemical leaching and/or by any other known process capable of removing applicable fugitive support materials. The fugitive support material 2 may contain a refractory material such that the resulting dispersion strengthened alloy layer 44 can be readily removed from the support material upon solidification and cooling. One non-limiting example of a suitable refractory support material 2 is a crucible and, by illustration, a crucible made of zirconia.

In these embodiments the filler material 8 is deposited or fed onto the surface of the fugitive support material 2, and then a metal deposition method of the present disclosure is performed optionally in the presence of a flux material to produce a dispersion strengthened alloy layer 44 situated on the fugitive support material 2. Following deposition of one or more layers 44, the fugitive support material 2 may be removed to reveal an object containing the dispersion strengthened alloy whose shape and grain structure is determined in part by the shape and composition of the fugitive support material 2.

Many forms of the fugitive support material 2 may be employed as long as the material is capable of supporting all three of the filler material 8, the melt pool 30 and the dispersion strengthened alloy layer 44, and is then removable from the dispersion strengthened alloy layer 44. In some embodiments the fugitive support material is in the form of a bed of an oxide-containing material (e.g., zirconia) or in the form of a flux material. In some cases it is advantageous to employ a bed of a powdered oxide-containing material or a powdered flux—such that particle sizes in the fugitive support material 2 are less than particle sizes in the filler material 8. Such an arrangement can reduce or minimize intrusion of the melt pool 30 into the bed of the fugitive support material 2. In other cases the fugitive support material 2 is in the form of a refractory container (e.g., a crucible or a mold) adapted to control the shape and optionally the grain structure of the resulting dispersion strengthened alloy 44.

Bulk dispersion strengthened alloys prepared by methods of the present disclosure benefit from an ability to precisely control the content, size, shape and distribution of the strengthening dispersoids 46a,b as explained above. Furthermore, use of at least one flux material permits fabrication of some bulk dispersion strengthened alloys without the need for vacuum conditions or the use of inert atmospheric conditions. In some embodiments bulk dispersion strengthened alloys may be prepared in the presence of significant quantities of atmospheric oxygen. In some cases bulk dispersion strengthened alloys may be prepared such that at least one of the propellant gases 40a,b contains some proportion of oxygen or consists of air. Surprisingly, the presence of a flux material in the melt pool 30 (and the resulting slag layer 50) may produce bulk dispersion strengthened alloys having optimal (strengthening) grain structure without the need for subsequent heat treatment of the bulk dispersion strengthened alloy. Additional heat treatment may optionally be performed to further improve the mechanical properties of bulk dispersion strengthened alloys prepared by methods of the present disclosure.

Bulk dispersion strengthened alloys prepared by methods of the present disclosure also benefit from an ability to control the grain structure of the resulting dispersion strengthened alloy layer 44 through directional solidification. FIG. 3 also depicts the optional use of a solidification mold 52 (left-hand portion shown) containing a mold bottom portion 54 and a mold side portion 56. Selecting refractory materials of relatively low or high thermal conductivity allows directional control of heat transfer during cooling of the formed dispersion strengthened alloy layer—such that the resulting dispersion strengthened alloy layer 44 may contain either uniaxial (columnar) or equiaxed grain structures. For example, in the non-limiting illustration of FIG. 3 the mold bottom portion 54 may be constructed of a high thermal conductivity material (e.g., graphite) and the mold side portion 56 may be constructed of a low thermal conductivity material (e.g., zirconia), which causes directional solidification to produce uniaxial (columnar) grains 58 oriented perpendicular to the plane of the mold bottom portion 54. By controlling the thermal conductivity of the bottom and side portions 54,56 of the refractory solidification mold 52 the grain structure of the resulting dispersion strengthened alloy layer 44 can be customized and varied. Directional solidification can also be affected by employing at least one chill plate (not shown in FIG. 3) situated to contact the mold bottom portion 54 and/or a heating plate situated to contact the mold side portion 56.

Some embodiments of the present disclosure exclude the use of the filler material and instead use a heat source to directly melt the surface of a metallic substrate to form the melt pool. In such embodiments the melt pool may be formed in the presence of a flux material either deposited on the surface of the metallic substrate or directed into the melt pool using at least one nozzle. In such cases a resulting slag layer provides the same benefits described above. The resulting dispersion strengthened alloy layer is thereby bonded to the metallic substrate.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
   melting an alloy material with a heat source to form a melt pool in the presence of a flux material;
   directing strengthening particles into the melt pool, such that the strengthening particles are dispersed within the melt pool; and
   allowing the melt pool to cool and solidify to form a dispersion strengthened alloy at least partially covered by a slag layer,
   wherein the heat source is an energy beam, and
   the strengthening particles are directed into a non-heating portion of melt pool such that the strengthening particles are not contacted by the energy beam.

2. The method of claim 1, further comprising depositing a powdered filler material comprising the alloy material onto adjacent surfaces of at least two juxtaposed metal substrates, such that the dispersion strengthened alloy forms a dispersion strengthened weld joint fusing the at least two juxtaposed metal substrates.

3. The method of claim 2, wherein the at least two juxtaposed metal substrates are dispersion strengthened alloy substrates.

4. The method of claim 1, further comprising depositing a powdered filler material comprising the alloy material onto a surface of a metallic substrate, such that upon cooling of the melt pool the dispersion strengthened alloy is bonded to the surface of the metallic substrate.

5. The method of claim 4, wherein:
   the powdered filler material further comprises the flux material; or
   the powdered filler material is covered by a layer of the flux material.

6. The method of claim 1, further comprising:
   depositing a powdered filler material comprising the alloy material onto a fugitive support material, such that upon cooling of the melt pool the dispersion strengthened alloy solidifies upon the fugitive support material; and
   removing the fugitive support material to obtain an object comprising the dispersion strengthened alloy.

7. The method of claim 1, comprising melting a surface of a metallic substrate comprising the alloy material with the heat source to form the melt pool, such that upon cooling of the melt pool the dispersion strengthened alloy is bonded to the metallic substrate.

8. The method of claim 1, wherein the strengthening particles comprise a metal nitride, a metal carbide, or both.

9. The method of claim 1, wherein the strengthening particles comprise at least one selected from the group consisting of boron nitride, aluminum nitride, silicon nitride, titanium nitride, vanadium nitride, chromium nitride, zirconium nitride, niobium nitride, hafnium nitride, tantalum nitride, boron carbide, aluminum carbide, silicon carbide, calcium carbide, titanium carbide, vanadium carbide, chromium carbide, zirconium carbide, nickel carbide, hafnium carbide and tungsten carbide.

10. The method of claim 1, wherein the heat source is selected from the group consisting of a photon beam, an electron beam, and a plasma beam.

11. The method of claim 1, wherein the strengthening particles are directed into the melt pool through a refractory injection nozzle that penetrates the slag layer or through a consumable cored injector that penetrates the slag layer.

12. The method of claim 1, wherein at least one of the following is satisfied:
the strengthening particles are directed into the melt pool with at least one propellant gas selected from the group consisting of air, argon, nitrogen and helium; and
the melting of the alloy material and the formation of the dispersion strengthened alloy occur under an oxygen-containing atmosphere.

13. The method of claim 1, wherein the melting occurs by rastering a laser beam across a surface of a powdered filler material comprising the alloy material such that at least one of the following is satisfied:
a perimeter of the strengthening particles directed into the melt pool fits within a perimeter of the melt pool; and
the rastering of the laser beam generates currents of molten material within the melt pool which distributes the strengthening particles within the melt pool.

14. A method comprising:
depositing a powdered filler material comprising an alloy material onto adjacent surfaces of at least two juxtaposed dispersion strengthened alloy substrates;
laser melting the powdered filler material in the presence of a flux material to form a melt pool covered by a slag layer;
injecting particles comprising a metal nitride, a metal carbide, or both, into the melt pool, such that the particles are dispersed within the melt pool; and
allowing the melt pool to cool and solidify to form a dispersion strengthened weld joint fusing the at least two dispersion strengthened alloy substrates.

15. The method of claim 14, comprising:
injecting the particles into a non-heating portion of the melt pool through an injection nozzle penetrating the slag layer, wherein the injection nozzle comprises at least one refractory material selected from the group consisting of a metal oxide, a metal carbide, a metal nitride and a graphite; or
directing the particles into the non-heating portion of the melt pool via a consumable cored injector penetrating the slag layer, wherein the consumable cored injector comprises a nickel-containing sheath surrounding a powdered core material comprising the particles.

16. A method comprising:
melting an alloy material with a heat source to form a melt pool in the presence of a flux material;
directing strengthening particles into the melt pool, such that the strengthening particles are dispersed within the melt pool; and
allowing the melt pool to cool and solidify to form a dispersion strengthened alloy at least partially covered by a slag layer,
depositing a powdered filler material comprising the alloy material onto a fugitive support material, such that upon cooling of the melt pool the dispersion strengthened alloy solidifies upon the fugitive support material; and
removing the fugitive support material to obtain an object comprising the dispersion strengthened alloy.

17. The method of claim 16, wherein:
the powdered filler material further comprises the flux material; or
the powdered filler material is covered by a layer of the flux material.

18. The method of claim 16, wherein the fugitive support material is a bed comprising an oxide-containing material or a flux material.

19. The method of claim 16, wherein the fugitive support material is a refractory container such that a shape of the object is controlled by an interior shape of the refractory container.

20. The method of claim 19, wherein refractory materials of the refractory container are selected to affect directional cooling of the melt pool such that the dispersion strengthened alloy comprises uniaxial grains.

* * * * *